US011293547B2

(12) United States Patent
Ono et al.

(10) Patent No.: US 11,293,547 B2
(45) Date of Patent: Apr. 5, 2022

(54) ROTATION POSITION DETECTION DEVICE FOR CHANGE DRUM AND MOTORCYCLE

(71) Applicant: Kawasaki Jukogyo Kabushiki Kaisha, Kobe (JP)

(72) Inventors: Masashi Ono, Kako-Gun (JP); Ichiro Tanaka, Kakogawa (JP); Kyohei Izumi, Kobe (JP)

(73) Assignee: Kawasaki Motors, Ltd., Hyogo (JP)

( * ) Notice: Subject to any disclaimer, the term of this patent is extended or adjusted under 35 U.S.C. 154(b) by 714 days.

(21) Appl. No.: 15/767,467

(22) PCT Filed: Nov. 11, 2016

(86) PCT No.: PCT/JP2016/083559
§ 371 (c)(1),
(2) Date: Apr. 11, 2018

(87) PCT Pub. No.: WO2017/082401
PCT Pub. Date: May 18, 2017

(65) Prior Publication Data
US 2018/0299010 A1    Oct. 18, 2018

(30) Foreign Application Priority Data
Nov. 12, 2015    (JP) .............................. JP2015-221747

(51) Int. Cl.
*F16H 63/18*    (2006.01)
*B62M 25/06*    (2006.01)
(Continued)

(52) U.S. Cl.
CPC ............. *F16H 63/18* (2013.01); *B62M 25/06* (2013.01); *F16H 59/70* (2013.01); *G01B 7/305* (2013.01); *G01D 5/145* (2013.01)

(58) Field of Classification Search
CPC ........ F16H 63/18; F16H 59/70; B62M 25/06; G01D 5/145
(Continued)

(56) References Cited

U.S. PATENT DOCUMENTS

2004/0139795 A1    7/2004    Kawakubo et al.
2008/0094058 A1    4/2008    Kawashima et al.
(Continued)

FOREIGN PATENT DOCUMENTS

| JP | S55-103714 A1 | 8/1980 |
|----|---------------|--------|
| JP | H02-043552 U  | 3/1990 |

(Continued)

OTHER PUBLICATIONS

Japanese Office Action (Application No. 2015-221747) dated Oct. 1, 2019 (with English translation).
(Continued)

*Primary Examiner* — Joseph Brown
(74) *Attorney, Agent, or Firm* — Burr & Brown, PLLC

(57) ABSTRACT

A rotation position detection device includes a change drum, a magnetic field generator, and a magnetic field detector. The magnetic field generator is fixed to the change drum and rotates along with the change drum to differentiate an ambient magnetic field. The magnetic field detector is formed separately from the magnetic field generator and fixed to a position at which a magnetic field changes in response to rotation of the magnetic field generator so as to detect the magnetic field and output a signal that depends on the rotational position of the change drum on the basis of the detection result.

13 Claims, 8 Drawing Sheets

(51) Int. Cl.
*F16H 59/70* (2006.01)
*G01B 7/305* (2006.01)
*G01D 5/14* (2006.01)

(58) Field of Classification Search
USPC ........................................................ 74/337.5
See application file for complete search history.

(56) References Cited

U.S. PATENT DOCUMENTS

| | | | | |
|---|---|---|---|---|
| 2012/0160026 | A1* | 6/2012 | Yamashita | F16C 41/007 |
| | | | | 73/504.01 |
| 2014/0343807 | A1 | 11/2014 | Maki | |
| 2015/0000448 | A1* | 1/2015 | Tetsuka | F16H 59/70 |
| | | | | 74/473.12 |
| 2015/0006042 | A1* | 1/2015 | Hotei | F16H 59/70 |
| | | | | 701/51 |
| 2017/0152945 | A1* | 6/2017 | Ishiyama | F16H 63/14 |

FOREIGN PATENT DOCUMENTS

| | | |
|---|---|---|
| JP | H11-115526 A1 | 4/1999 |
| JP | 2001-242188 A1 | 9/2001 |
| JP | 2004-203313 A1 | 7/2004 |
| JP | 2005-090638 A1 | 4/2005 |
| JP | 2007-040850 A1 | 2/2007 |
| JP | 2008-102076 A1 | 5/2008 |
| JP | 2011-095180 A1 | 5/2011 |
| JP | 2011-158081 A1 | 8/2011 |
| JP | 2012-103185 A1 | 5/2012 |

OTHER PUBLICATIONS

International Search Report and Written Opinion (Application No. PCT/JP2016/083559) dated Jan. 31, 2017.

* cited by examiner

F I G . 6
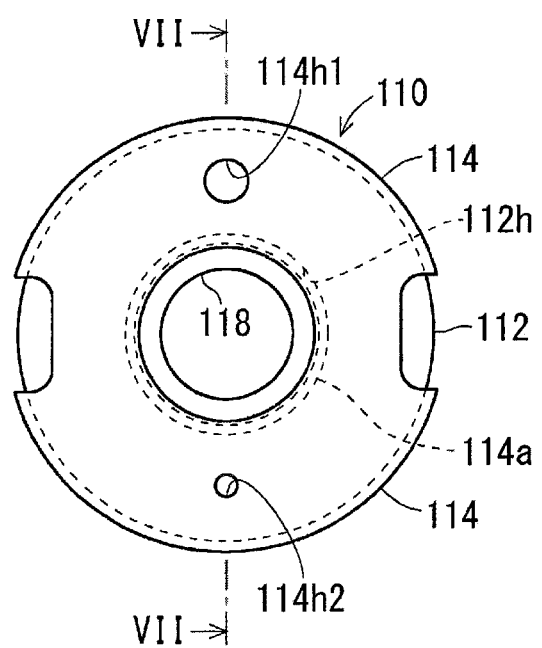

ROTATION POSITION DETECTION DEVICE FOR CHANGE DRUM AND MOTORCYCLE

TECHNICAL FIELD

The present invention relates to a technique for detecting a rotational position of a change drum in a speed changer of a vehicle such as a motorcycle.

BACKGROUND ART

Patent Literature 1 discloses a gear position detection device as a rotation position detection device for a change drum, the gear position detection device including a resistor fixed to a shift drum (change drum) and resistance detection means provided radially outward of the resistor. An outer peripheral surface of the resistor has an electrical contact surface. This contact surface is connected to a resistance element and body-grounded via the resistance element. The resistance detection means is in contact with the contact surface of the resistor and detects a potential difference between the body-grounded portion and the contact surface so as to determine the gear position. According to Patent Literature 1, electrical continuity is established between the resistor and the body-grounded portion via parts such as the shift drum and a bearing that are in electrical continuity and contact with the resistor.

Patent Literature 2 discloses a gear position detection device as a rotation position detection device for a change drum, the gear position detection device including a conductive metal member fixed to a shift drum (change drum), and two terminals that selectively come in contact with the conductive metal member in response to rotation of the conductive metal member. The gear position detection device determines the gear position by detecting a potential difference between the two terminals.

PRIOR ART DOCUMENTS

Patent Literatures

Patent Literature 1: Japanese Unexamined Utility Model Application Laid-Open No. 2-43552
Patent Literature 2: Japanese Patent Application Laid-Open No. 2004-203313

SUMMARY OF INVENTION

Problems to be Solved by Invention

According to the technique disclosed in Patent Literature 1, the potential difference detected by the resistance detecting means may vary due to variations in the state of contact between the resistor and the member that is in electrical continuity and contact with the resistor. Such variations in potential difference may result in erroneous detection of the gear position.

According to the technique disclosed in Patent Literature 2, it is necessary for the case to have a contact surface in which electric resistance changes, over a relatively wide range that corresponds to a range where the shift drum makes relative rotation. This structure reduces flexibility in design at the time of installing the gear position detection device on the case.

In view of this, it is an object of the present invention to minimize erroneous detection of the rotational position and to minimize constraints on layout at the time of installing the rotation position detection device for detecting the rotational position of the change drum on the case or other parts.

Means for Solving Problems

To solve the above-described problems, a rotation position detection device for a change drum according to a first aspect includes a magnetic field generator that is fixed to a change drum and that rotates along with the change drum to differentiate an ambient magnetic field, the change drum transmitting force necessary to shift a gear by rotating about a predetermined rotation axis, and a magnetic field detector that is formed separately from the magnetic field generator and fixed to a position at which the magnetic field changes in response to rotation of the magnetic field generator, to detect the magnetic field and output a signal that depends on a rotational position of the change drum on the basis of a detection result.

A second aspect is directed to the rotation position detection device for a change drum according to the first aspect. The device further includes a case that houses the change drum. The magnetic field generator is disposed inward of a wall of the case, and the magnetic field detector is disposed at a position inward of the wall and opposing the magnetic field generator.

A third aspect is directed to the rotation position detection device for a change drum according to the second aspect, in which the wall has a through hole for guiding a signal output by the magnetic field detector to outside of the case, and the through hole is formed at a position away from an extension of the rotation axis.

A fourth aspect is directed to the rotation position detection device for a change drum according to the third aspect, in which the magnetic field detector is held by a holder, and the holder is inserted in the through hole to support the magnetic field detector.

A fifth aspect is directed to the rotation position detection device for a change drum according to the fourth aspect, in which a fixing piece protrudes from an outer periphery of the holder, and the fixing piece is fixed to the wall, with the holder being inserted in the through hole.

A sixth aspect is directed to the rotation position detection device for a change drum according to any one of the second to fifth aspects, in which the magnetic field detector is disposed at a position opposing the magnetic field generator along a direction of extension of the rotation axis.

A seventh aspect is directed to the rotation position detection device for a change drum according to any one of the first to sixth aspects, in which the change drum is formed in a stepped shape having different radial dimensions in a direction of extension of the rotation axis, the magnetic field generator is formed in a ring shape centered about the rotation axis, and the magnetic field generator has an external diameter dimension that is smaller than a maximum external diameter dimension of the change drum and greater than a minimum external diameter dimension of the change drum.

An eighth aspect is directed to the rotation position detection device for a change drum according to any one of the first to seventh aspects, in which the magnetic field generator is fixed on a side toward the change drum with respect to a bearing by which one end of the change drum is rotatably supported, and the magnetic field detector is supported radially outward of the bearing.

A ninth aspect is directed to the rotation position detection device for a change drum according to any one of the first to eighth aspects, in which the change drum has a press-fit part that protrudes along the rotation axis, and the magnetic field generator includes a ring-shaped permanent magnet having a through hole for fixation, and a shock-absorbing part that fixes the permanent magnet to the press-fit part while intervening between the press-fit part and the permanent magnet.

A motorcycle according to a tenth aspect includes the rotation position detection device for a change drum according to any one of the first to ninth aspects.

Advantageous Effects of Invention

According to the first to tenth aspects, the magnetic field detector is formed separately from the magnetic field generator and fixed to the position at which a magnetic field changes in response to rotation of the magnetic field generator, so as to detect the magnetic field and output a signal that depends on the rotational position of the change drum on the basis of the detection result. The rotational position of the change drum can be detected on the basis of this signal. Thus, it is possible to detect the rotational position of the change drum without being affected by the state of contact between a plurality of objects and to minimize erroneous detection of the rotational position. Besides, since the magnetic field detector is fixed to a position at which the magnetic field changes in response to the rotation of the magnetic field generator, there is no need to dispose the magnetic field detector over a relatively wide range that corresponds to a range where the change drum makes relative rotation. This structure minimizes constraints on layout at the time of installing the rotation position detection device on the case or other parts.

According to the second aspect, the magnetic field detector can be disposed as close as possible to the magnetic field generator that rotates along with the change drum on the inner side of the wall of the case. Accordingly, it is possible to more accurately detect the rotational position of the magnetic field generator.

According to the third aspect, the through hole for guiding the signal output by the magnetic field detector to the outside of the case can be formed at any position in the wall away from the extension of the rotation axis. This improves flexibility in design. For example, the through hole can be formed without interfering with a bearing that is formed on the wall to support the change drum.

According to the fourth aspect, the through hole serves to guide the output signal output by the magnetic field detector to the outside while supporting the magnetic field detector. This simplifies the structure.

According to the fifth aspect, the magnetic field detector can be fixed to the wall while being prevented from rotating, as a result of the holder being inserted in the through hole and the fixing piece that protrudes from the outer periphery of the holder being fixed to the wall. This facilitates the mounting operation while preventing misregistration.

According to the sixth aspect, the area of the magnetic field detector disposed in close proximity to the magnetic field generator is increased as compared with the case where the magnetic field detector opposes the periphery of the magnetic field generator in the radial direction of the change drum. This improves the accuracy of detection.

According to the seventh aspect, the external diameter dimension of the magnetic field generator can be increased while being kept within the maximum external diameter dimension of the change drum. This improves the accuracy of detection.

According to the eighth aspect, the magnetic field detector can be supported by a portion that is radially outward of the bearing by which the change drum is rotatably supported. This eliminates the need to provide a support-only part and simplifies the structure.

According to the ninth aspect, the press-fit part of the change drum is press-fitted in the magnet via the shock-absorbing part. This prevents residual stress occurring at the time of press fitting from reaching the magnet and prevents damage to the permanent magnet.

BRIEF DESCRIPTION OF DRAWINGS

FIG. 6 is a side view of a magnetic field generator;

MODES FOR IMPLEMENTING INVENTION

Hereinafter, a rotation position detection device for a change drum and a motorcycle according to an embodiment will be described.

Motorcycle

Figure 1:
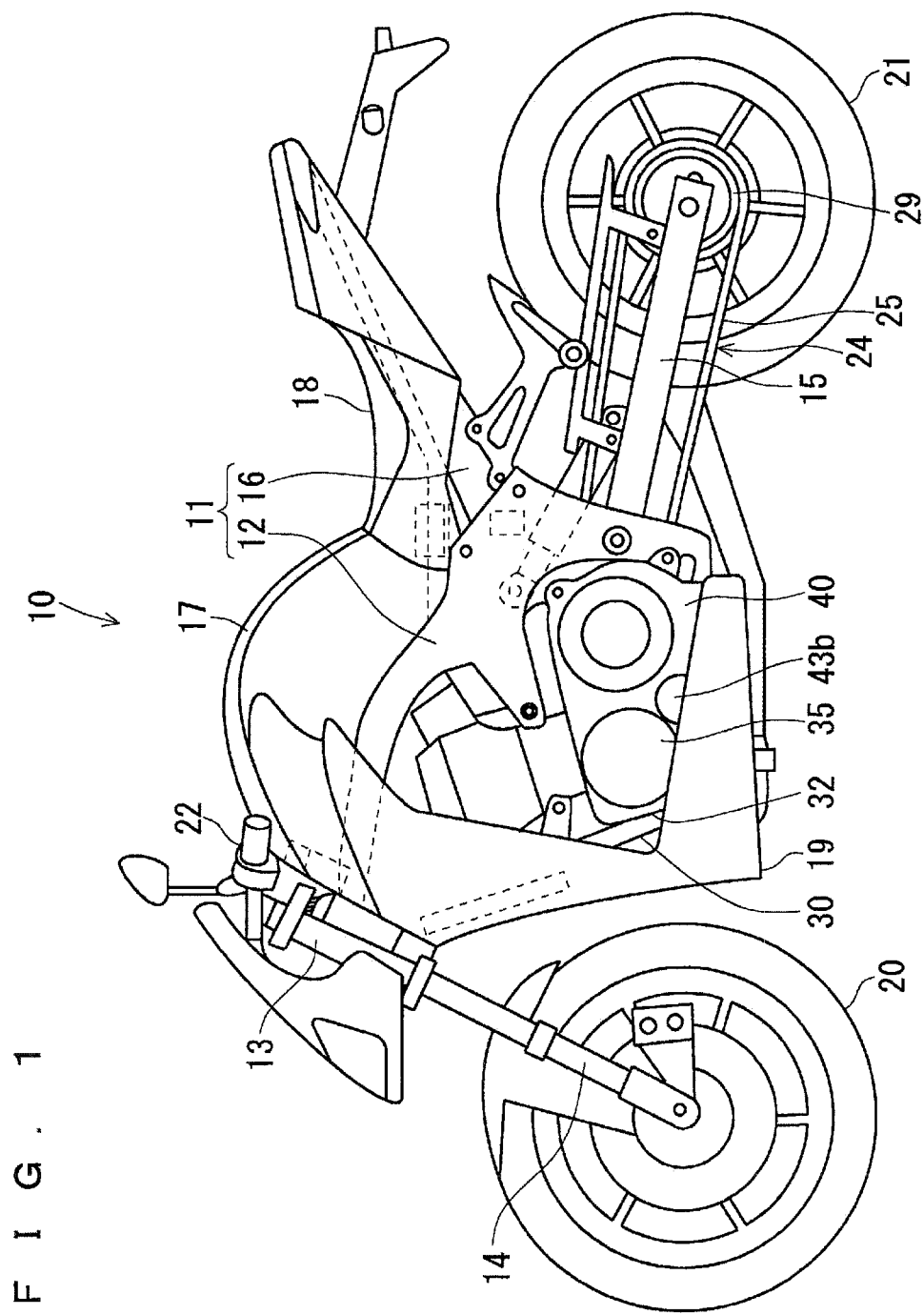
FIG. 1 is a side view of a motorcycle according to an embodiment.

First, an overall configuration of the motorcycle will be described. FIG. 1 is a side view of a motorcycle 10 that includes a rotation position detection device 100 for detecting the rotational position of a change drum 60.

The motorcycle 10 includes a body frame 11, a front wheel 20, a rear wheel 21, a handle 22, an engine 30, and a transmission 40.

The body frame 11 includes a main frame 12 that is provided on the front side of the motorcycle 10, and a rear frame 16 that is coupled to the rear of the main frame 12 and extends rearward of the main frame 12.

A head pipe 13 is attached to the front part of the main frame 12, and a steering shaft (not shown) is rotatably inserted through the head pipe 13. A front fork 14 is fixed to the lower end of the steering shaft so as to extend downward, and the front wheel 20 is rotatably supported by the lower end of the front fork 14. The handle 22 is fixed to the upper end of the front fork 14. The orientation of the front wheel 20 can be changed by operating the handle 22.

A swing arm 15 is fixed to the rear of the main frame 12 so as to extend rearward. The swing arm 15 is swingably supported by the main frame 12 so that the rear end of the swing arm 15 shifts up and down. The rear wheel 21 is rotatably supported by the rear end of the swing arm 15.

When viewed from one side, the engine 30 and the transmission 40 are incorporated into the center of the main frame 12. In the present example, the engine 30 and the transmission 40 are provided as an integral unit, with the transmission 40 located on the rear side of the engine 30. A secondary speed-reducing mechanism 24 that includes a chain 25 and other parts is disposed between the transmission 40 and the rear wheel 21. Rotational movement generated by the engine 30 is changed in speed by the transmission 40 and transmitted to the rear wheel 21 via the secondary speed-reducing mechanism 24. The secondary speed-reducing mechanism may be a mechanism for transmitting rotational movement to the rear wheel via a belt or a shaft drive.

A fuel tank 17 is fixed to the top of the main frame 12. At the rear of the fuel tank 17, a rider seat 18 is fixed on the rear frame 16.

Side covers 19 are provided on the opposite sides of the main frame 12. In the present example, the side covers 19 cover the front and sides of the engine 30, for example. Alternatively, the side covers 19 may be omitted.

Transmission

Figure 2:
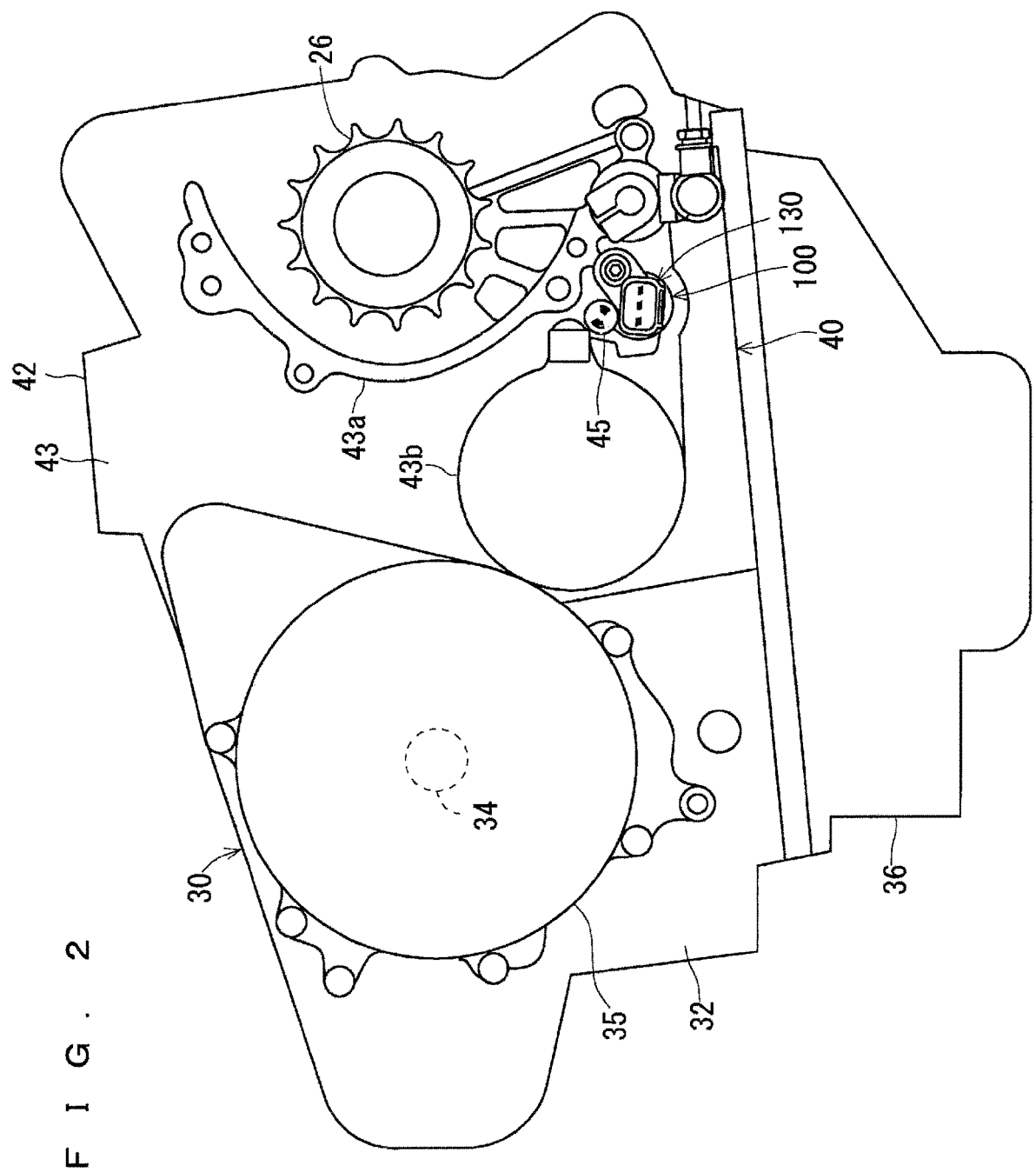
FIG. 2 is a side view of a transmission.

An overall configuration of the transmission 40 will be described. FIG. 2 is a side view of the transmission 40.

The transmission 40 includes a case (gear case) 42. The case 42 is integrated with a crank case 32 of the engine 30. An oil pan 36 is fixed to the bottoms of the case 42 and the crank case 32. The oil pan 36 retains oil that circulates through the engine 30 and the transmission 40.

A crank shaft 34 is rotatably supported by the crank case 32. Rotational movement generated by the engine 30 is output via the crank shaft 34. While the present embodiment describes an example in which the engine 30, i.e., an internal combustion engine, serves as a mechanism for generating rotational movement, other mechanisms such as a motor may be used, instead of the engine 30.

A generator 35 is attached to one side of the crank case 32. The generator 35 is coupled to the crank shaft 34 and generates electric power from the rotational movement of the crank shaft 34.

Figure 3:
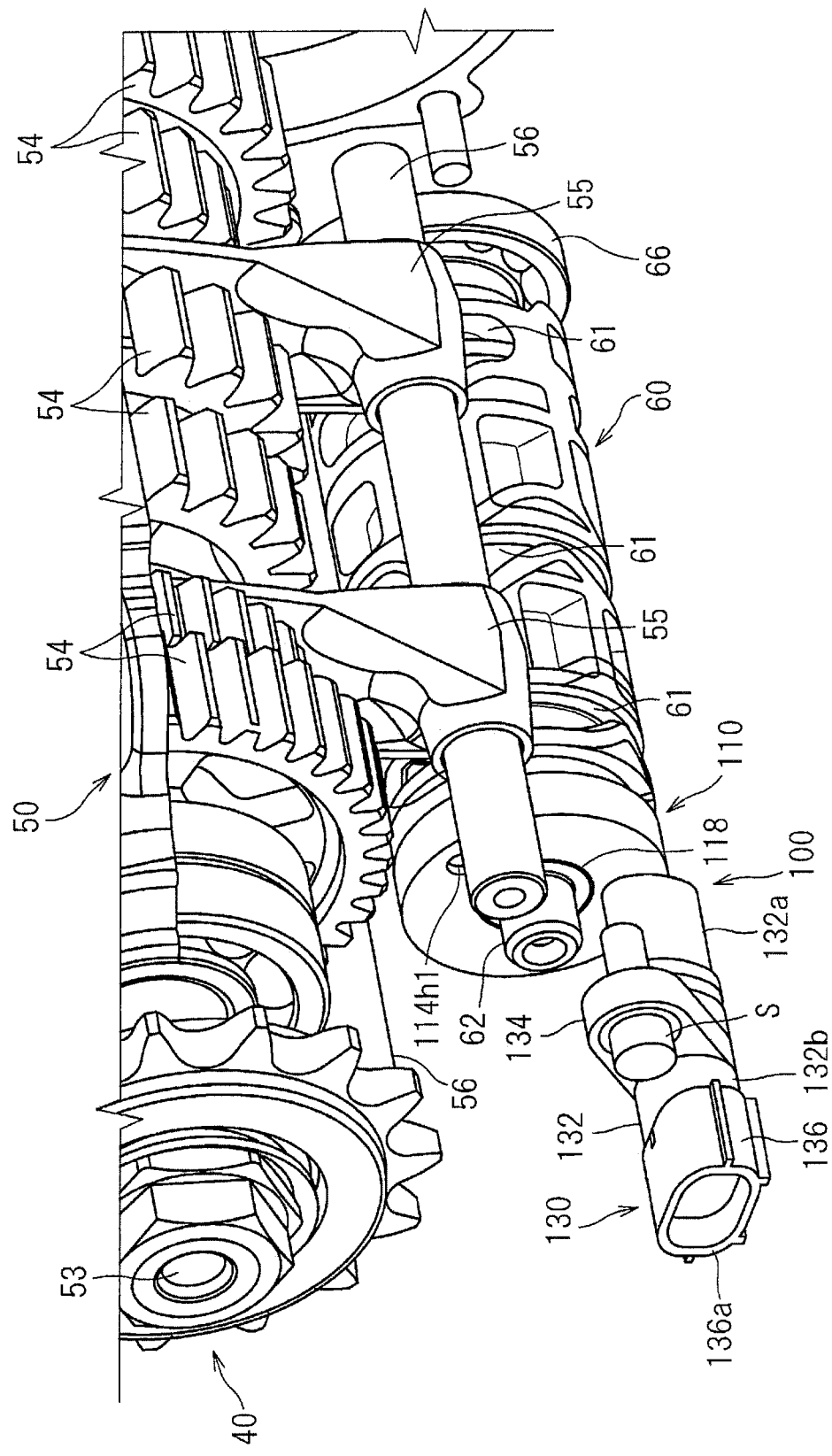
FIG. 3 is a perspective view of a speed change gear mechanism and a rotation position detection device that are housed in a case.

FIG. 3 is a perspective view of a speed change gear mechanism 50 that is housed in the case 42. FIG. 3 also illustrates the rotation position detection device 100. Each mechanism housed in the case 42 in FIG. 2 will also be described in detail hereinafter with reference to FIG. 3.

The speed change gear mechanism 50 (see FIG. 3) is provided in the case 42. The speed change gear mechanism 50 includes a main shaft, a plurality of main gears, a drive shaft 53, a plurality of drive gears 54, a plurality of shifting forks 55, and the change drum 60. The speed change gear mechanism 50 is what is called a constant-mesh transmission mechanism.

The drive shaft 53 is supported along the width of the motorcycle in the case 42. In the present example, the drive shaft 53 is disposed at a position rearward of the main shaft in the vehicle. One end of the drive shaft 53 protrudes outward from a position on one side of the case 42 and fixed to a sprocket 26 so as to prevent relative rotation of the drive shaft and the sprocket. The chain 25 of the secondary speed-reducing mechanism 24 is wounded over the sprocket 26 and a sprocket 29 on the rear wheel 21 (see FIGS. 1 and 2). Rotational movement of the drive shaft 53 is transmitted via the chain 25 to the rear wheel 21.

The main shaft is supported along the width of the motorcycle at a position adjacent to the drive shaft 53 in the case 42. The main shaft is coupled to the crank shaft 34 via a primary speed-reducing mechanism constituted by gears or a chain, for example, and a clutch mechanism. The main shaft is rotationally driven in response to rotational movement generated by the engine 30. While configurations relating to the main shaft, the main gears, and the shifting forks for shifting the main gears are not illustrated in FIG. 3, these mechanisms are similar to those relating to the drive shaft, the drive gears, and the shifting forks for shifting the drive gears.

The drive gears 54 are fitted on the drive shaft 53, and some of the drive gears are supported so as to be movable in the axial direction of the drive shaft 53 and not to be rotatable relative to the drive shaft 53.

The main gears are fitted on the main shaft, and some of the main gears are supported so as to be movable in the axial direction of the main shaft and not to be rotatable relative to the main shaft.

When some of the main gears are moved in the axial direction of the main shaft, the engagement via dogs between the moved main gears and adjacent main gears changes in such a way that the rotational movement of the main shaft is selectively transmitted to a plurality of main gears. Similarly, when some of the drive gears 54 are moved in the axial direction of the drive shaft 53, the engagement via dogs between the moved drive gears 54 and adjacent drive gears 54 changes. Accordingly, the rotational movement of the drive gears 54 is selectively transmitted to the drive shaft 53. A power transmission pathway constituted by a combination of at least one of the main gears and at least one of the drive gears 54 is switched by changing the engagement of these gears. At this time, the plurality of main gears include those having different external diameter dimensions, and the plurality of drive gears 54 include those having different external diameter dimensions. Thus, by changing the combination of at least one of the main gears and at least one of the drive gears 54, it is possible to change a speed-reducing ratio for use at the time of transmitting rotational movement from the main shaft to the drive shaft 53.

The shifting forks 55 and the change drum 60 constitute a mechanism for moving some of the main gears in the axial direction of the main shaft and moving some of the drive gears 54 in the axial direction of the drive shaft 53.

Figure 5:
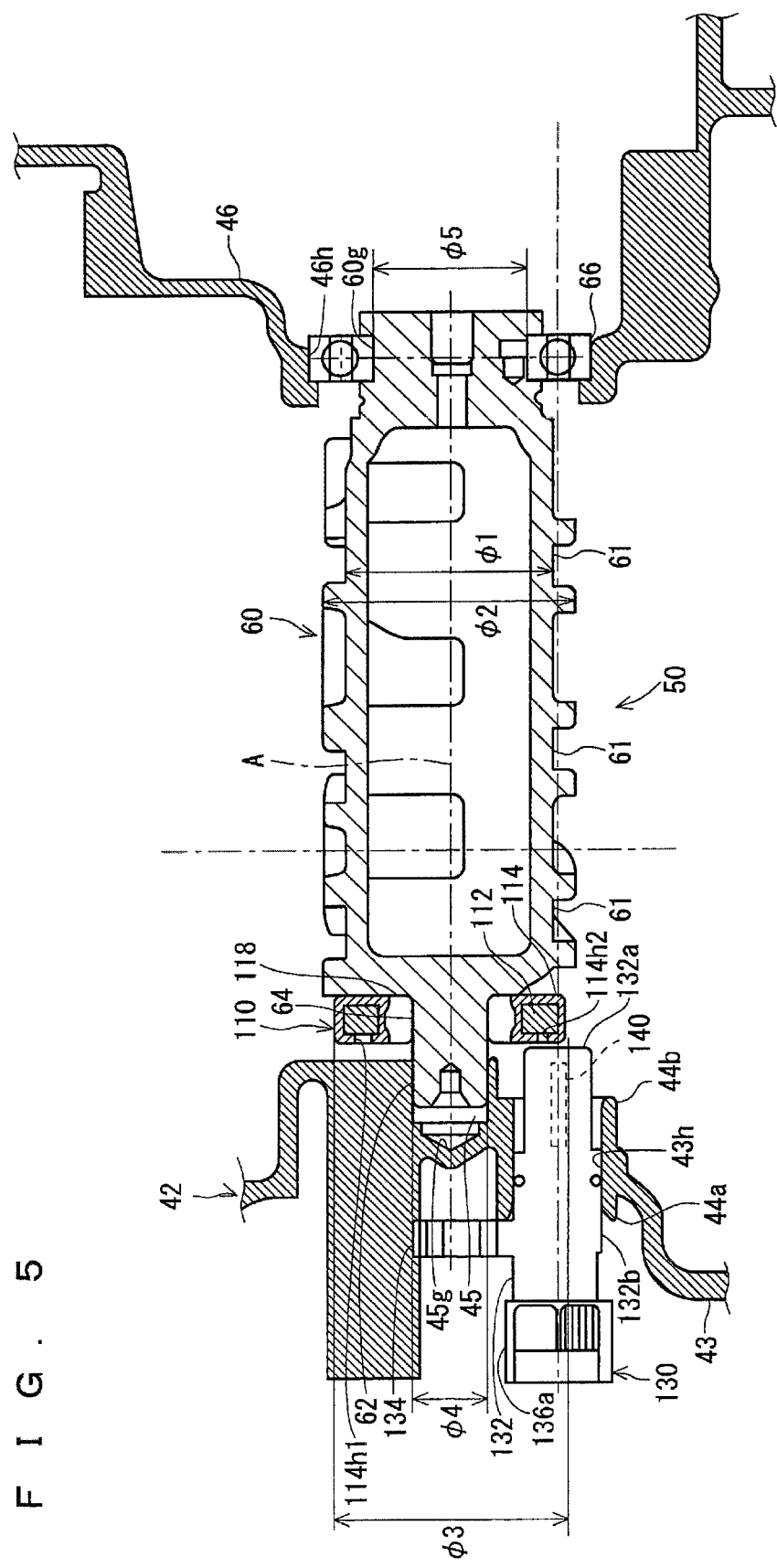
FIG. 5 is a cross-sectional view taken along line V-V in FIG. 4.

The change drum 60 is housed in the case 42 so as to be rotatable about a predetermined rotation axis A (see FIG. 5). In the present example, the change drum 60 is rotatably housed at a position below the space between the main shaft and the drive shaft 53 in the case 42.

The outer periphery of the change drum 60 has a plurality of cam grooves 61. In the present example, the outer periphery of the change drum 60 has three cam grooves 61 spaced in the axial direction of the change drum 60. The three cam grooves include serpentine portions in the peripheral direction of the change drum 60.

One end of the change drum 60 is rotatably supported by a wall 43 on one side of the case 42. The other end of the change drum 60 is rotatably supported on the other side of the case 42. The other end of the change drum 60 is provided with a change pedal and a change mechanism for transmitting an operation made to the change pedal to the change drum 60 (not shown). Each time the change pedal is pushed up, the change drum 60 rotates by a predetermined angle in a predetermined rotation direction. Each time the change pedal is pushed down, the change drum 60 rotates by a predetermined angle in the opposite rotation direction to the above rotation direction.

In the case 42, shift rods 56 are supported along the width of the motorcycle 10 between the change drum 60 and the main shaft and between the change drum 60 and the drive shaft 53. The shifting forks 55 are supported so as to be movable in the axial direction of one of the two shift rods 56. A root end of each shifting fork 55 is fitted in a cam groove 61 so as to be movable in the direction of extension of the cam groove 61. The tip of each shifting fork 55 is coupled to a movable one of the main gears or a movable one of the drive gears 54 in such a manner as to allow the gear to rotate. When the change drum 60 has rotated about the predetermined rotation axis A, each shifting fork 55 moves in the axial direction of a shift rod 56 in accordance with the shape of the corresponding cam groove 61. As a result, movable ones of the main gears and movable ones of the drive gears 54 move and accordingly the speed-reducing ratio is changed, i.e., a gear shift occurs. That is, the change drum 60 rotates about the predetermined rotation axis A so as to transmit the force required to change the speed.

By operating the change pedal in this way, the transmission 40 can change the speed-reducing ratio for use at the time of transmitting the rotational movement of the main shaft to the drive shaft 53. While some of the main gears and some of the drive gears 54 are shifted and moved by the rotation of the change drum 60 in the present embodiment, it is not an absolute necessity. For example, dog rings may be shifted and moved by the rotation of the change drum in a configuration in which the dog rings are fitted on a gear shaft so as to be movable in the axial direction of the gear shaft and not to be rotatable relative to the gear shaft, and are engaged with gears that are rotatably fitted on the gear shaft so that rotational movement is transmitted between the gear shaft and the gears.

The structure for supporting the above-described change drum 60 will now be described.

Figure 4:
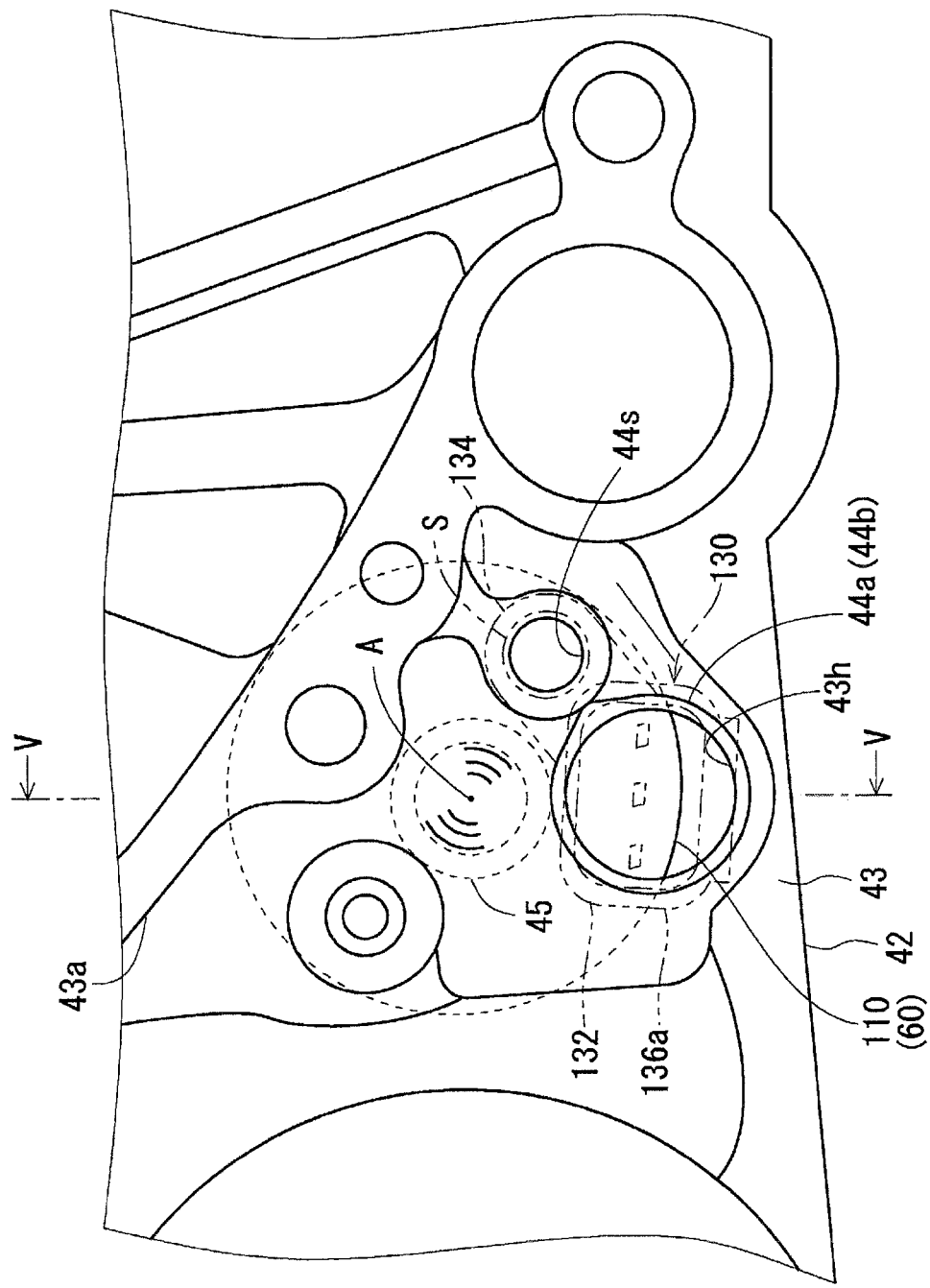
FIG. 4 is a side view of a portion of a wall of the case that supports a change drum.

FIG. 4 is a side view of a portion of the wall 43 of the case 42 that supports the change drum 60, and FIG. 5 is a cross-sectional view taken along line V-V in FIG. 4.

One end of the change drum 60 has a round rod-like support shaft protrusion 62 that protrudes along the rotation axis A. The wall 43 has a bearing 45. The bearing 45 is fitted in a bearing recess 45g formed in part of the inner surface of the wall 43. The bearing recess 45g itself is formed in a shape capable of receiving the support shaft protrusion 62. In the present example, a portion of the outer surface of the wall 43 where the bearing recess 45g is formed protrudes outward such that the bearing recess 45g can be formed as deep as possible.

The aforementioned support shaft protrusion 62 is rotatably fitted in the bearing recess 45g via the bearing 45, and accordingly the one end of the change drum 60 is supported so as to be capable of angular displacement.

The other end of the change drum 60 is rotatably supported by a ball bearing 66 that is fitted in a hole 46h formed in a wall 46 of the case 42 (on the opposite side of the wall 43).

As will be described later in detail, a magnetic field detector 140 is supported by a portion that is adjacent to the bearing recess 45g formed in the wall 43. Thus, the magnetic field detector 140 can be disposed at a position close to a magnetic field generator 110 without interfering with the aforementioned ball bearing 66.

Besides, since the bearing 45, by which the one end of the change drum 60 is rotatably supported, is provided in the bearing recess 45g that is a recessed area in the wall 43, the wall 43 can be sealed from both inside and outside with that portion. This structure prevents lubricating oil on the one end of the change drum 60 from leaking out and adhering to the magnetic field detector 140.

In this state, the other end of the change drum 60 is rotatably supported by the wall 46 on the opposite side of the case 42.

The structure in which the change drum 60 is rotatably supported is not limited to the example described above. A rolling bearing may be fixed to the wall on one side of the case so that a support shaft protrusion at one end of the change drum is rotatably supported by the rolling bearing. As another alternative, a support shaft protrusion may be provided on the other end of the change drum and may be rotatably supported either by being inserted in a through hole formed in the wall on the other side of the case or by a change mechanism fixed to the wall on the other side of the case.

When a rider of the motorcycle has operated the change pedal, the change drum 60 rotates, and the transmission 40 shifts gears from the first via the neutral position to the second, third, and so on. The rider on the motorcycle is unable to directly check the rotational position or other conditions of the change drum 60. Thus, it would be convenient if the gear position of the transmission 40 is displayed for the rider through detection of the rotational position of the change drum 60. Moreover, if it is possible to control factors such as the ignition timing of the engine 30, the timing of fuel ejection, and the amount of ejection according to the position of the transmission 40, this would contribute to a reduction in the fuel consumption of the motorcycle 10. For the purpose of attaining at least one of such objectives, the rotation position detection device 100 for detecting the rotational position of the change drum 60 is installed in the motorcycle 10.

The rotation position detection device 100 is preferably installed in close proximity to either end of the change drum 60 because it needs to detect the rotational position of the change drum 60 and to retrieve the detection output to the outside. In the present example, the rotation position detection device 100 is installed in close proximity to the one end of the change drum 60.

Here, the support shaft protrusion 62 protrudes from the one end of the change drum 60 and is rotatably supported by the bearing 45 on the wall 43. Various structural parts are disposed around the aforementioned bearing 45 on the outer surface of the wall 43 of the case 42. For example, an arcuate protrusion 43a that surrounds the sprocket 26 protrudes obliquely upward and rearward of the bearing 45. Moreover, for example, a cooling pump 43b (e.g., an oil pump or a water pump) is fixed to the front of the bearing 45. Accordingly, there is only a limited space available to fix the rotation position detection device 100 around the aforementioned bearing 45 on the outer surface of the wall 43 of the case 42. The rotation position detection device 100 described herein has the following configuration so as to be installed in the case 42 or other parts while minimizing constraints on layout.

Rotation Position Detection Device for Change Drum

The rotation position detection device 100 for detecting the rotational position of the change drum 60 will be described with reference to FIGS. 3 to 5.

The rotation position detection device 100 is a device that includes the magnetic field generator 110 and the magnetic field detector 140 and for detecting the rotational position of the change drum 60.

The magnetic field generator 110 is fixed to the change drum 60 and configured to be capable of differentiating an ambient magnetic field by rotating along with the change drum 60. In the present example, the magnetic field generator 110 is fixed to the one end of the change drum 60.

The magnetic field detector 140 is formed separately from the magnetic field generator 110 and fixed to a position at which a magnetic field changes in response to rotation of the magnetic field generator 110. In the present example, the magnetic field detector 140 is supported by the wall 43 of the case 42 so as to be disposed at a position opposing the magnetic field generator 110 along the direction of extension of the rotation axis A of the change drum 60. The magnetic field detector 140 detects the magnetic field that changes in response to the rotation of the magnetic field generator 110, and outputs a signal that depends on the rotational position of the change drum 60 on the basis of the detection result.

On the basis of this output signal from the magnetic field detector 140, a control unit (not shown) including a determination part 302 identifies the rotational position of the change drum 60 and determines the gear position of the transmission 40. This determination result may be used as a basis to display the gear position on a display such as a light emitting diode (LED) or to control the engine.

Magnetic Field Generator

The magnetic field generator 110 will now be described more specifically.

Figure 7:
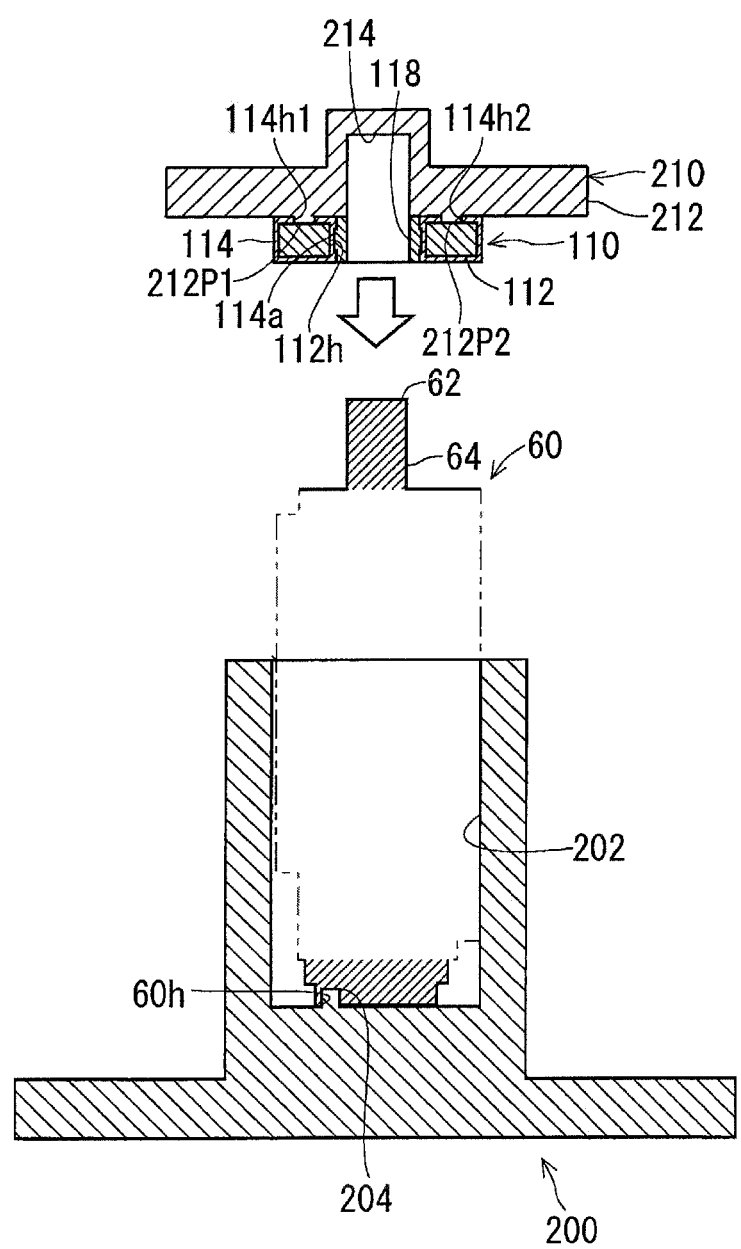
FIG. 7 is a descriptive diagram illustrating an example of the process of fixing the magnetic field generator to the change drum.

FIG. 6 is a side view of the magnetic field generator 110, and FIG. 7 is a descriptive diagram illustrating an example of the process of fixing the magnetic field generator 110 to the change drum 60. FIG. 7 is a cross-sectional view taken along line VII-VII in FIG. 6. As illustrated in FIGS. 3 and 5 to 7, the magnetic field generator 110 is formed generally in a ring shape. The central axis of the magnetic field generator 110 matches the rotation axis A of the change drum 60 in a state where the magnetic field generator 110 is fixed to the change drum 60.

The magnetic field generator 110 generates a magnetic field having an orientation that is preset with reference to the magnetic field generator 110. When the magnetic field generator 110 undergoes angular displacement about the rotation axis A along with the change drum 60, the orientation of the magnetic field undergoes angular displacement about the rotation axis of the change drum 60 along with the magnetic field generator 110. Thus, there is a correlation between the amount of angular displacement (gear shift position) about the rotation axis A relative to a reference position of the change drum 60 and the orientation of the magnetic field generated by the magnetic field generator 110. That is, the aforementioned amount of angular displacement (gear shift position) of the change drum 60 can be estimated by detecting the orientation of the magnetic field generated by the magnetic field generator 110. The term "rotation" as used in the present invention is assumed to include angular displacement of 360° or less.

In the present example, the magnetic field generator 110 includes a permanent magnet 112, a cover part 114, and a ring-shaped press-fit part 118.

The permanent magnet 112 directs the distribution of magnetic fields. The distribution of magnetic fields is set to have rotational asymmetry with respect to the rotation axis A in a state in which the magnetic field generator 110 is fixed to the change drum 60.

Thus, the rotational position of the permanent magnet 112 and the rotational position of the change drum 60 can be detected by detecting the orientation of the magnetic field at a certain fixed measuring point around the permanent magnet 112.

Using the permanent magnet 112 as the magnetic field generator 110 eliminates the need for a structure that supplies electric power to the change drum 60, as compared with the case of using an electromagnet, and simplifies the structure.

The cover part 114 is a resin member that covers the permanent magnet 112. In the present example, the cover part 114 covers both outer and inner peripheries and both sides of the permanent magnet 112. A pair of side portions across the central axis of the outer periphery of the permanent magnet 112 are exposed from the cover part 114. These exposed portions can be used to locate the permanent magnet 112 when the cover part 114 is molded using the permanent magnet 112 as an insert. This fixes the position of the permanent magnet 112 in the cover part 114.

Although the cover part 114 does not necessarily have to be made of a resin, it is preferable for the cover part 114 to be made of a material that is more easily deformable than the permanent magnet 112 and to be disposed at least between the permanent magnet 112 and a press-fit projection (press-fit part) 64, when consideration is given to the fact that the cover part 114 includes a portion that serves as a shock-absorbing part 114a as will be described later.

Molding the cover part 114 using the permanent magnet 112 as an insert is not an absolute necessity. For example, a configuration is possible in which the cover part has a decomposable structure having a recess in which the permanent magnet can be housed, and decomposed parts of the structure are united to house the permanent magnet. As another alternative, the cover part 114 may be omitted.

The magnetic field generator 110 is fixed to the change drum 60 in the following manner.

The one end of the change drum 60 has the press-fit projection 64 that protrudes along the rotation axis A. In the present example, the press-fit projection 64 has a circular columnar shape, but it may have other shapes such as a polygonal prism shape.

The ring-shaped press-fit part 118 is fixed to the inside of a circular hole 112h of the permanent magnet 112. The ring-shaped press-fit part 118 is a ring-shaped member made of a metal such as a sintered alloy. The internal diameter dimension of the ring-shaped press-fit part 118 is set to be greater than the external diameter dimension of the press-fit projection 64 (set to dimensions that allow press fitting). The press-fit projection 64 can be press-fitted in the ring-shaped press-fit part 118. With the press-fit projection 64 being press-fitted in the ring-shaped press-fit part 118, the ring-shaped press-fit part 118 and the press-fit projection 64 are unable to rotate relative to each other, and accordingly the magnetic field generator 110 can be attached to the one end of the change drum 60 in such a manner that the magnetic field generator 110 and the change drum 60 are unable to rotate relative to each other.

The ring-shaped shock-absorbing part 114a that fixes the ring-shaped press-fit part 118 to the inside of the circular hole 112h is provided while intervening between the circular hole 112h of the permanent magnet 112 and the ring-shaped press-fit part 118. In the present example, the ring-shaped shock-absorbing part 114a is a ring-shaped part that covers the inner circumference of the circular hole 112h of the aforementioned cover part 114.

Employing a structure in which the press-fit projection 64 is press-fitted in the ring-shaped press-fit part 118 reduces damage to the permanent magnet 112 at the time of press fitting. Specifically, if the press-fit projection 64 is directly press-fitted in the permanent magnet 112, the inner periphery of the permanent magnet is easily deformed so as to increase its diameter. Such deformation to increase diameter may damage the permanent magnet 112. In view of this, the ring-shaped press-fit part 118 is used as a target in which the press-fit projection 64 is directly press-fitted, with the intervention of the shock-absorbing part 114a. This reduces damage to the permanent magnet 112.

The configuration may be such that the ring-shaped press-fit part 118 is fixed to the cover part 114 by molding the cover part 114 using the ring-shaped press-fit part 118 as an insert, or that the ring-shaped press-fit part 118 is fitted in the inner periphery of the cover part 114. The present example employs the former configuration. That is, the cover part 114 is molded using the permanent magnet 112 and the ring-shaped press-fit part 118 described above as inserts. As a result, the permanent magnet 112, the cover part 114, and the ring-shaped press-fit part 118 are integrally combined with one another to form the magnetic field generator 110.

The ring-shaped shock-absorbing part 114*a* made of a resin is relatively easily compressed or deformed, for example, as compared with the ring-shaped press-fit part 118 made of a metal such as a sintered alloy. Thus, even if the ring-shaped press-fit part 118 is deformed so as to increase its diameter, the ring-shaped shock-absorbing part 114*a* itself, for example, becomes deformed so as to be compressed and thereby serves as a cushion to minimize the force acting on the permanent magnet 112 due to the deformation. Accordingly, deformation of the ring-shaped press-fit part 118 is less likely to cause deformation of the permanent magnet 112 and is less likely to damage the permanent magnet 112 at the time of press fitting.

The ring-shaped shock-absorbing part 114*a* does not necessarily have to be made of a resin, and may be made of a material that is more easily deformable than the press-fit part. The intervention of the easily deformable shock-absorbing part suppresses the transmission of stress induced by press fitting to the permanent magnet.

While the present embodiment describes an example in which the shock-absorbing part that intervenes between the permanent magnet and the press-fit projection 64 is the ring-shaped shock-absorbing part 114*a*, the shock-absorbing part may be formed in a shape other than a ring shape. For example, a plurality of shock-absorbing parts may be arranged at intervals in the circumferential direction.

The ring-shaped shock-absorbing part 114*a* does not necessarily have to be configured as part of the cover part 114. For example, in a configuration in which the cover part 114 is omitted, a member that is more easily deformable than the ring-shaped press-fit part may be used as a ring-shaped shock-absorbing part that intervenes between the circular hole of the permanent magnet and the ring-shaped press-fit part.

The extension dimension of the aforementioned press-fit projection 64 is set to be greater than the thickness dimension of the magnetic field generator 110. Thus, when the press-fit projection 64 is press-fitted in the magnetic field generator 110 until the magnetic field generator 110 comes in contact with the end surface of the change drum 60 from which the press-fit projection 64 protrudes, the tip of the press-fit projection 64 protrudes from the magnetic field generator 110. This tip of the press-fit projection 64 serves as the aforementioned support shaft protrusion 62 and is rotatably supported by the bearing 45. Accordingly, the magnetic field generator 110 is fixed to the change drum 60 on the side toward the change drum 60 with respect to the wall 43 and the bearing 45.

The magnetic field generator 110 is formed in a shape having the following external diameter dimension in relation to the dimensions of the change drum 60.

Specifically, the change drum 60 is formed in a stepped shape having different radial dimensions in the direction of the rotation axis A (see FIG. 5). More specifically, the change drum 60 has the cam grooves 61 and large-radial-diameter portions that are portions on the opposite sides of the cam grooves 61 in the direction of the rotation axis A and that define the opposite side surfaces of the cam grooves 61.

The one end of the change drum 60 (end on the same side as the magnetic field detector 140) has the support shaft protrusion 62 that is supported by the bearing 45, and the other end of the change drum 60 has a portion 60*g* in which the ball bearing 66 is fitted. Assume that $\phi 1$ is the external diameter dimension of the aforementioned cam grooves 61, $\phi 2$ is the maximum external diameter dimension of the large-radial-diameter portions, $\phi 4$ is the external diameter dimension of the support shaft protrusion 62, and $\phi 5$ is the external diameter dimension of the portion in which the ball bearing 66 is fitted.

In this case, the maximum external diameter dimension of the change drum 60 is $\phi 2$. In the present example, the external diameter dimension $\phi 5$ of the portion in which the ball bearing 66 is fitted is smaller than the external diameter dimension $\phi 1$ of the cam grooves 61, and the external diameter dimension $\phi 4$ of the support shaft protrusion 62 is smaller than the external diameter dimension $\phi 5$ of the portion in which the ball bearing 66 is fitted. Thus, the minimum external diameter dimension of the change drum 60 is $\phi 4$. The external diameter dimension $\phi 3$ of the magnetic field generator 110 is set to be greater than the minimum external diameter dimension $\phi 4$ and smaller than the maximum external diameter dimension $\phi 2$. Accordingly, the size of the magnetic field generator 110 can be increased as large as possible in the space between the wall 43 of the case 42 and the change drum 60 while housing the magnetic field generator 110 within a space formed by laterally extending the change drum 60. If the size of the magnetic field generator 110 can be increased as large as possible, the size of the permanent magnet 112 can also be increased as large as possible. This maximizes the strength of a magnetic field to be generated and therefore contributes to improving the accuracy of detection.

Preferably, the external diameter dimension $\phi 3$ of the magnetic field generator 110 is set to be greater than the external diameter dimension $\phi 1$ of the cam grooves 61. This allows the magnetic field generator 110 to become further enlarged.

Depending on the structure for supporting the change drum 60, the minimum external diameter dimension may be either the external diameter dimension $\phi 5$ of the portion 60*g* in which the ball bearing 66 is fitted, or the external diameter dimension $\phi 1$ of the cam grooves 61.

Since the magnetic field generator 110 described herein is configured to include the cover part 114 that covers the permanent magnet 112, the maximum external diameter dimension of the cover part 114 is the external diameter dimension $\phi 3$ of the magnetic field generator 110. In the case where the cover part 114 is omitted, the external diameter dimension $\phi 3$ of the permanent magnet may be set to be greater than $\phi 1$ and smaller than $\phi 2$.

The magnetic field generator 110 is formed in a rotationally asymmetric shape, when viewed about the rotation axis A of the change drum 60.

In the present example, portions of the magnetic field generator 110 that face outward when the magnetic field generator 110 is fixed to the change drum 60 have recesses 114*h*1 and 114*h*2. In the present embodiment, the magnetic field generator 110 is configured to cover the permanent magnet 112 with the cover part 14, and therefore the cover part 114 has the recesses 114*h*1 and 114*h*2. The recesses 114*h*1 and 114*h*2 are formed at opposite positions across the central axis of the magnetic field generator 110. One recess 114*h*1 is formed larger than the other recess 114*h*2. These recesses 114*h*1 and 114*h*2 impart a rotational asymmetry to the magnetic field generator 110.

When the magnetic field generator 110 has a rotationally asymmetric shape as described above, the magnetic field generator 110 can be fixed to the change drum 60 in such a manner that the magnetic pole of the magnetic field generator 110 is supported at a certain fixed rotational position with respect to the change drum 60 as illustrated in FIG. 7.

In the present example, the other end of the change drum 60 is also formed in a rotationally asymmetric shape. In the present example, the other end of the change drum 60 has a recess 60h. The recess 60h is formed in a single place in the circumferential direction of the other end, and the presence of the recess 60h allows the other end of the change drum 60 to have a rotationally asymmetric shape.

The press-fitting operation is carried out using a press-fit receiving jig and a press-fit arrow 210. The press-fit receiving jig 200 has a circular columnar housing recess 202 that is capable of housing the change drum 60. The bottom of the housing recess 202 has a locating protrusion 204 that is capable of fitting in the aforementioned recess 60h. The change drum 60 is inserted in the housing recess 202 with the other end of the change drum 60 facing the innermost recess, so that the positioning protrusion 204 is fitted in the recess 60h. As a result, the change drum 60 is held in a certain fixed rotational posture at a certain fixed position by the press-fit projection 64.

The press-fit arrow 210 is configured such that one major surface of a plate-like part 212 has locating protrusions 212P1 and 212P2 that can be press-fitted in the recesses 114h1 and 114h2. The press-fit arrow 210 also has a clearance recess 214 that is capable receiving the support shaft protrusion 62 between the locating protrusions 212P1 and 212P2. The locating protrusions 212P1 and 212P2 are press-fitted in the recesses 114h1 and 114h2, so that the magnetic field generator 110 is held by the press-fit arrow 210. As a result, the magnetic field generator 110 is held in a certain fixed rotational posture at a certain fixed position by the press-fit arrow 210.

The press-fit receiving jig 200 and the press-fit arrow 210 described above can be controlled to the desired postures by a manufacturing device for use in the press-fitting operation. Then, the press-fit receiving jig 200 and the press-fit arrow 210 are brought close to each other to establish a certain fixed correlation, and the press-fit projection 64 and the support shaft protrusion 62 are press-fitted in the ring-shaped press-fit part 118 of the magnetic field generator 110. This allows the magnetic field generator 110 to be easily fixed to the change drum 60 at a certain fixed rotational position.

Note that when the magnetic field generator 110 has a rotationally asymmetric shape as described above, the operator is also able to identify the rotational position of the magnetic field generator 10. Thus, the magnetic field generator 110 can be easily fixed in a certain fixed rotational posture to the change drum 60, irrespective of the use of the press-fit receiving jig 200 and the press-fit arrow 210.

Magnetic Field Detector

Figure 8:
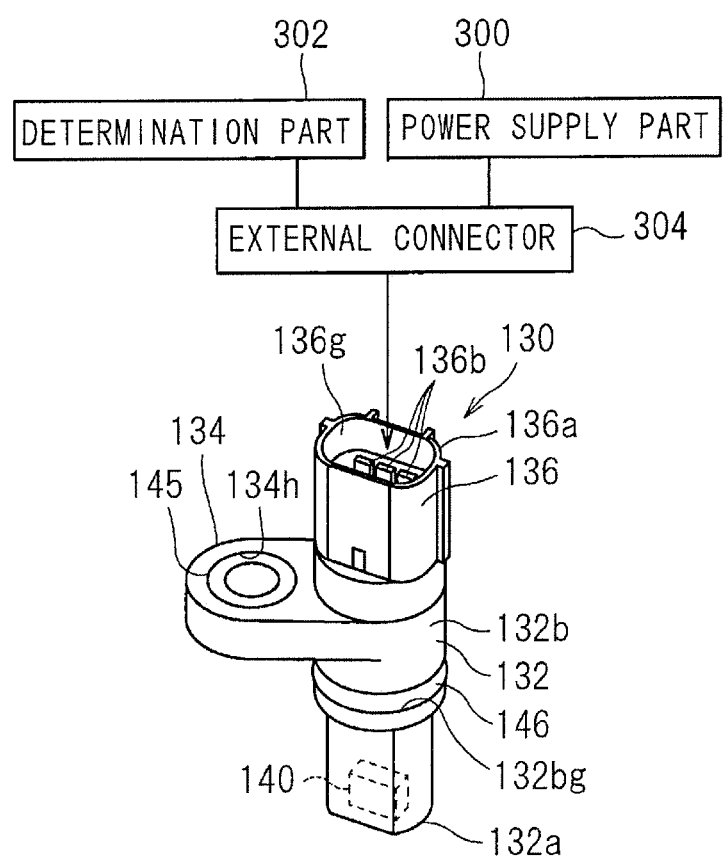
FIG. 8 is a perspective view of a magnetic field detection module.

FIG. 8 is a perspective view of a magnetic field detection module 130 that includes the magnetic field detector 140. The magnetic field detection module 130 is also illustrated in FIGS. 2 to 5.

The magnetic field detector 140 is configured to be capable of detecting the orientation of a magnetic field and outputting the detection result as an electrical signal. The magnetic field detector 140 is fixed to an absolute position at which position and posture are fixed irrespective of the rotation of the change drum 60, and is disposed at a position at which the magnetic field detector is capable of detecting the orientation of the magnetic field generated by the magnetic field generator 110. By detecting the orientation of the magnetic field generated by the magnetic field generator 110, the magnetic field detector 140 can estimate the aforementioned amount of angular displacement (gear position) of the change drum 60.

In the present example, the magnetic field detector 140 is formed separately from the magnetic field generator 110. The magnetic field detector 140 detects the magnetic field generated by the magnetic field generator 110 and outputs a signal that depends on the rotational position of the change drum 60 on the basis of the detection result.

In the present example, the magnetic field detector 140 is embedded in a resin part and forms part of the magnetic field detection module 130. An overall configuration of the magnetic field detection module 130 will now be described.

The magnetic field detection module 130 includes the magnetic field detector 140, a holder 132, a fixing piece 134, a connector 136, and wiring.

The magnetic field detector 140 is configured by, for example, a hall integrated circuit (IC) that integrates a hall device, an amplifier, and other devices together. That is, the magnetic field detector 140 is a non-contact sensor that is spaced from the magnetic field generator 110. The magnetic field detector 140 outputs a signal that depends on the condition of a magnetic field at the time when the rotational position of the change drum 60 is detected. Instead of the hall IC, the magnetic field detector 140 may also be a sensor that includes a bridge-connected magneto-resistance-effect element, or a sensor that includes a bridge-connected magneto-impedance component. In the present example, the magnetic field detector 140 outputs a voltage that is proportional to a magnetic flux angle (i.e., angular displacement of the permanent magnet 112 fixed to the change drum 60). The determination part 302, which will be described later, reads an output voltage that is output from the magnetic field detector and determines the angle of the change drum (gear position).

In the present example, the magnetic field detector 140 includes wiring for supplying driving power and wiring for outputting a detection signal. The wiring for supplying driving power is electrically connected to a power supply part 300 via the connector 136, an external connector 304 that is connector-connected to the connector 136, external wiring, and so on. The wiring for outputting a detection signal is electrically connected to the determination part 302 via the connector 136, the external connector 304 connected to the connector 136, external wiring, and so on. Fixing the magnetic field detector 140 to the case 42 prevents the magnetic field detector 140 and the case 42 from undergoing displacement along with the change drum 60 and simplifies the structure.

The holder 132, the fixing piece 134, and a housing 136a of the connector 136 are made of a resin. In the present example, the resin is molded using the magnetic field detector 140 and connector terminals 136b as inserts so that the holder 132, the fixing piece 134, and the housing 136a are integrally molded. Alternatively, these parts may have a united structure obtained by combining a plurality of parts.

The holder 132 has a long shape. More specifically, the holder 132 includes a detector holder 132a and a body part 132b.

One end of the body part 132b is insertable in a through hole 43h formed in the wall 43. In the present example, the body part 132b has a circular columnar shape. However, the body part 132b does not necessarily have to have a circular columnar shape, and may have other shapes such as an elliptic columnar shape or a polygonal prism shape.

The outer circumference of one end portion of the body part 132b has a circumferential groove 132bg in which a sealing ring 146 is fitted. The sealing ring 146 is a member made of an elastic material such as rubber, i.e., a so-called O ring. With the body part 132b being inserted in the through hole 43h, the sealing ring 146 intervenes in a compressed state between the body part 132b and the through hole 43h. Accordingly, the case 42 is sealed at the portion where the through hole 43h is formed, and this structure suppresses, for example, leakage of oil from the inside of the case 42.

The detector holder 132a is formed on and protrudes from one end of the body part 132. The detector holder 132a has a smaller diameter than the body part 132b. In the present example, the detector holder 132a has a circular columnar shape having flat side portions across the central axis of the circular column.

The fixing piece 134 is formed to protrude outward from part of the outer circumference of the body part 132b. The fixing piece 134 has a flat slim plate-like shape extending in a direction orthogonal to the axis of the body part 132b. In the present example, there is only one fixing piece 134. A tip portion of the fixing piece 134 has a hole 134h, and a ring-shaped bushing 145 made of a metal or other materials is fixed to the inside of the hole 134h. Preferably, the fixing piece 134 is molded using the bushing 145 as an insert. A screw S, which will be described later, is threaded through the bushing 145.

In this magnetic field detection module 130, the magnetic field detector 140 is integrated with the holder 132 in a preset orientation with respect to the holder 132. As a result, the magnetic field detector 140 is located in a preset orientation at the position where the holder 132 is locked by the fixing piece 134. This eliminates the need to adjust the orientation at the mounting position of the magnetic field detection module 130, and when the magnetic field detection module 130 is fixed to the case, the magnetic field detector 140 can be disposed in the orientation suitable for detection.

Besides, the holder 132 is disposed off a screw hole 44s in the direction perpendicular to the up-down direction (forward and backward direction of the vehicle). Thus, even if an oil leak occurs from the screw hole 44s, it is possible to prevent the oil from adhering to the connector 136 at the external end of the holder 132.

The connector 136 includes the housing 136a and the connector terminals 136b.

The housing 136a is provided so as to protrude from the other end of the body part 132b. The end of the housing 136a has a connector recess 136g. The plurality of connector terminals 136b are provided so as to protrude from the bottom of the connector recess 136g. The connector 136 is connector-connected to a mating connector that is mounted to an end of a wiring harness. Then, the detection signal obtained by the magnetic field detector 140 is output via the connector 136, the wiring harness, and other parts to, for example, the determination part that determines the rotational position of the change drum 60 on the basis of the detection signal.

The above-described magnetic field detector 140 is fixed at a position at which the magnetic field detector 140 can detect a change in the magnetic field generated by the magnetic field generator 110.

The magnetic field detector 140 is fixed to the wall 43 of the case 42. Specifically, the wall 43 of the case 42 has the through hole 43h (see FIGS. 4 and 5). In the present example, the through hole 43h is provided at a position away from the extension of the rotation axis A, more specifically, at a position away from the extension of the rotation axis A in the lower part of the motorcycle 10. The through hole 43h is formed in an area that overlaps with the magnetic field generator 110 when viewed along the rotation axis A.

Auxiliary cylindrical parts 44a and 44b are formed in portions of the outer and inner surfaces of the wall 43 that surround the through hole 43h. The through hole 43h is formed so as to be surrounded by an inner peripheral surface that is contiguous to the inner peripheral surfaces of the auxiliary cylindrical parts 44a and 44b. In the present example, the through hole 43h has a circular shape. Since the body part 132b has a circular columnar shape and the through hole 43h has a circular shape, the through hole 43h can be easily drilled. Alternatively, the body part may have a non-circular shape, and the through hole may also be formed in a non-circular shape corresponding to the external shape of the body part. A sealing structure using the sealing ring 146 that intervenes between the body part 132b and the through hole 43h can easily be manufactured by providing the sealing ring 146 on the body part 132b. Specifically, in the case of providing the sealing ring on the through hole, it is necessary to form a ring-shaped groove in the inner periphery of the through hole in order to locate and hold the sealing ring. However, processing for forming such a ring-shaped groove in the through hole is difficult. On the other hand, the circumferential groove 132bg can relatively easily be formed in the outer periphery of the body part 132b at the time of molding or other times. Thus, the aforementioned sealing structure can easily be manufactured by employing the structure in which the sealing ring 146 is mounted on the body part 132b.

The aforementioned through hole 43h is a hole for guiding the signal output by the magnetic field detector to the outside of the case 42. In the present embodiment, the through hole 43h is also a hole for supporting the magnetic field detector 140.

The screw hole 44s is formed at a position away from the through hole 43h in the outer surface of the wall 43, and in the present example, at a position diagonally upward and rearward away from the through hole 43h in the motorcycle 10.

The aforementioned holder 132 is inserted in the through hole 43h from the outside of the wall 43. At this time, the holder 132 is inserted in the through hole 43h until the tip portion of the holder 132 protrudes inside the case 42 through the through hole 43h. In this state, at least part of the magnetic field detector 140 at the tip portion of the holder 132 protrudes inside the case 42. Preferably, a portion of the magnetic field detector 140 that incorporates the hall device may be disposed inside the inner surface of the wall 43 of the case 42.

As a result, the magnetic field detector 140 is disposed at a position at which the magnetic field detector 140 can detect the magnetic field generated by the magnetic field generator 110.

The magnetic field detector 140 is disposed inward in the axial direction of the axial end of the change drum 60 (tip portion of the support shaft protrusion 62). This structure reduces the amount of protrusion of the magnetic field detection module 130 to the outside of the case 42 in the aforementioned axial direction.

In the present example, the through hole 43h is formed in the area that overlaps with the magnetic field generator 110 when viewed along the rotation axis A. In particular, with the holder 132 being inserted in the through hole 43h, the magnetic field detector 140 held by the holder 132 is disposed in the area that overlaps with the magnetic field generator 110 when viewed along the rotation axis A. Thus, the magnetic field detector 140 is disposed at a position inward of the wall 43 and opposing the magnetic field generator 110 along the direction of extension of the rotation axis A.

The position where the aforementioned magnetic field detector 140 is supported is in a portion that is radially outward of the bearing 45. Thus, the magnetic field detector 140 can be supported at a position as close as possible to the magnetic field generator 110 by using the portion of the wall 43 that is adjacent to and radially outward of the bearing 45.

With the holder 132 being inserted in the through hole 43h as described above, the root end of the fixing piece 134 abuts on the peripheral edge of the auxiliary cylindrical part 44a. The rotational position of the magnetic field detection module 130 is adjusted such that the fixing piece 134 is located outward of the aforementioned screw hole 44s. Then, the screw S is threaded through the hole of the bushing 145 and engaged with and fastened to the screw hole 44s in a state in which the hole of the bushing 145 of the fixing piece 134 and the screw hole 44s are arranged coaxially. The fixing piece 134 is fixed to the wall 43 and prevents the holder 132 from coming off the through hole 43h. The fixing piece 134 also limits the rotation of the holder 132 relative to the through hole 43h.

In this way, the magnetic field detection module 130 is fixed to the wall 43, and accordingly, the magnetic field detector 140 is fixed.

This mounting structure prevents the magnetic field detector 140 from coming off the through hole 43h because the fixing piece 134 is fixed to the wall 43 in the axial direction of the through hole 43h.

In particular, the fixing piece 134 abuts on the outer surface of the wall 43 that is the side surface of the case 42 in the direction in which the holder 132 is inserted. Thus, the axial position of the holder 132 relative to the case 42 can accurately be located. Since the magnetic field detector 140 is set to be located at the position where the fixing piece 134 abuts on the outer surface of the wall 43, the magnetic field detector 140 can easily be disposed as close as possible to the magnetic field generator 110 while avoiding contact between the magnetic field detector 140 and the magnetic field generator 110.

The fixing piece 134 is fixed to the wall 43 while the holder 132 is inserted in the through hole 43h. This locks the holder 132 at the time of mounting, i.e., prevents a shift in the orientation of the magnetic field detector 140, thus facilitating the mounting operation. In addition, using only one fixing piece 134 further downsizes the mounting structure.

With the magnetic field detection module 130 being fixed to the wall 43, the connector 136 is disposed outside the case 42. This prevents adhesion of lubricating oil to the connector 136. The magnetic field detector 140 disposed in the case 42 is covered with the holder (in the present example, a resin mold). This prevents adhesion of lubricating oil to the magnetic field detector 140. Then, the magnetic field detector 140 is connected to external parts such as the determination part via the connector 136.

Operations

The operations of the rotation position detection device 100 for detecting the rotational position of the change drum will be described.

First, assume that the change drum 60 is located at a predetermined gear position (e.g., neutral position) in the initial state. In this state, the magnetic field detector 140 outputs a detection result that depends on the magnetic field generated by the magnetic field generator 110.

When the rider has operated the change pedal in this state, the change drum 60 rotates to a gear position (e.g., first gear position) that depends on the rider's operation. Then, the rotation of the change drum 60 is transmitted to the main gears, the drive gears 54, and other parts, so that the transmission 40 shifts the gears to the first. Since the magnetic field generator 110 also rotates in response to the rotation of the change drum 60, the magnetic field relative to the magnetic field detector 140 will change. Thus, the magnetic field detector 140 outputs a detection result that depends on the magnetic field generated by the magnetic field generator 110.

Similarly, the rider operates the change pedal to rotate the change drum 60 to the other gear positions (e.g., second, third, or other gear positions). Then, the transmission 40 shifts the gears (e.g., to the second, third, and so on). Since the magnetic field generator 110 also rotates in response to the rotation of the change drum 60, the magnetic field relative to the magnetic field detector 140 will change. Thus, the magnetic field detector 140 outputs a detection result that depends on the magnetic field generated by the magnetic field generator 110.

At least one of the direction and orientation of the magnetic field generated by the magnetic field generator 110 differs at each rotational position at each gear position (e.g., first, neutral, second, third, and so on) of the aforementioned change drum 60. The magnetic field detector 140 outputs a different detection result for each gear position (e.g., first, neutral, second, third, and so on) in accordance with the magnetic field.

On the basis of this detection result, the determination unit is capable of identifying the rotational position of the change drum 60 to determine the gear position of the transmission 40.

Advantageous Effects of Embodiments

According to the rotation position detection device 100 for detecting the rotational position of a change drum and the motorcycle 10 configured as described above, the magnetic field detector 140 is formed separately from the magnetic field generator 110 and fixed to the position at which a magnetic field changes in response to the rotation of the magnetic field generator 110, so as to detect the magnetic field and output a signal that depends on the rotational position of the change drum 60 on the basis of the detection result. The rotational position of the change drum 60 can be detected on the basis of this signal. Thus, it is possible to detect the rotational position of the change drum 60 without being affected by the state of contact between a plurality of objects unlike in Patent Literature 1, and to minimize erroneous detection of the rotational position.

Since the magnetic field detector 140 only needs to be fixed to the position at which a magnetic field changes in response to the rotation of the magnetic field generator 110, there is no need to dispose the magnetic field detector 140 at a position lateral to the change drum 60 (e.g., wall) over a relatively wide range that corresponds to a range where the change drum 60 makes relative rotation. That is, at a position lateral to the change drum 60, the magnetic field detector 140 only needs to be disposed in part of the area where the change drum 60 makes relative rotation. This minimizes constraints on layout at the time of installing the rotation position detection device 100 in the case 42 or other parts.

The magnetic field detector 140 is disposed at a position inward of the wall 43 and opposing the magnetic field generator 110. Thus, the magnetic field detector 140 can be disposed as close as possible to the magnetic field generator 110, which rotates along with the change drum 60, inside the wall 43. This increases the accuracy in detecting the rotational position of the magnetic field generator 110.

Alternatively, when consideration is given to, for example, a situation where the case is made of a non-magnetic material such as aluminum (preferably, non-magnetic metal material), the magnetic field generator may be disposed so as to detect the magnetic field of the magnetic field generator via the wall. For example, the magnetic field detector may be disposed within the wall, instead of protruding inward of the wall. As another alternative, the magnetic field detector may be disposed outside the wall.

The magnetic field detector 140 may be fixed to a part other than the case that houses the change drum. For example, when the case and the bearing support wall are formed separately, the magnetic field detector may be supported by the bearing support wall. When an adjacent wall that is adjacent to the case is formed within the engine outside the case, the magnetic field detector may be supported by the adjacent wall. Such an adjacent wall that supports the magnetic field detector may be an external wall of the crank case, or may be a cover member that covers the crank case. That is, the member that supports the magnetic field detector 140 is not limited to the case 42, and may be any member that supports the magnetic field detector 140 while having a certain positional relationship with the magnetic field generator 110.

The wall 43 has the through hole 43h at a position away from the extension of the rotation axis A, the through hole 43h being a hole for guiding the signal output by the magnetic field detector 140 to the outside of the case 42. This improves flexibility in the design of the rotation position detection device 100 and the transmission 40. For example, the through hole 43h may be formed while the bearing 45 for supporting the change drum 60 is provided on the wall 43.

The magnetic field detector 140 is held by the holder 132, and the holder 132 is inserted in the through hole 43h, so that the magnetic field detector 140 is supported at a certain fixed position. Thus, the through hole 43h serves to guide the signal output by the magnetic field detector 140 to the outside while supporting the magnetic field detector 140.

Holding the magnetic field detector 140 in the through hole 43h is, however, not an absolute necessity. Specifically, the present invention also includes a case in which a portion where the through hole is formed and a portion where the magnetic field detector is supported are provided at different positions. For example, the magnetic field detector may be fixed to the inside of the wall by screwing or other means. In this case, the through hole may be a hole that can only pass a wiring member extending from the magnetic field detector. This structure minimizes the dimension of the through hole that is formed in the wall. Forming the through hole and the supporting portion at different positions eliminates the need for the portion where the through hole is formed so as to have a support function, thus improving flexibility in design.

Only one fixing piece 134 protrudes from the outer periphery of the holder 132, and with the holder 132 being inserted in the through hole 43h, the fixing piece 134 is fixed to the wall 43. That is, the presence of the one fixing piece 134 suppresses the coming off of the holder 132 from the through hole 43h and also suppresses the rotation of the holder 132 relative to the through hole 43h. This simplifies the structure for mounting the magnetic field detector 140 to the wall 43.

Alternatively, a plurality of fixing pieces may protrude circumferentially from the outer periphery of the holder. Each fixing piece preferably has a structure that prevents the holder from rotating about the axis of the through hole, and may use a fastening member to achieve such a structure, or may be structured to engage with the wall of the case so as to achieve a structure that prevents the rotation of the holder.

The magnetic field detector 140 is disposed at the position opposing the magnetic field generator 110 along the rotation axis A. Assuming a case where the magnetic field detector opposes the outer periphery of the magnetic field generator, it is difficult to increase the area of the magnetic field detector that is in close proximity to the outer peripheral surface of the magnetic field generator because the outer periphery of the magnetic field generator has a curved surface. In the present example, the magnetic field detector 140 opposes an outward flat surface of the magnetic field generator 110. Thus, it is possible to maximize the area of the magnetic field detector 140 that is in close proximity to the magnetic field generator 110 and to further improve the accuracy of detection.

However, it is of course possible to dispose the magnetic field detector on the outer peripheral side of the magnetic field generator.

The magnetic field generator 110 is fixed on the side toward the change drum 60 with respect to the bearing 45 that rotates the one end of the change drum 60, and is supported radially outward of the bearing 45. Thus, the magnetic field detector 140 can be supported as close as possible to the magnetic field generator 110 by using the portion that is adjacent to and radially outward of the bearing 45 by which the change drum 60 is rotatably supported.

The magnetic field detector may be fixed to either the inside or outside of the wall on the extension of the rotation axis A.

Variations

While the above embodiment describes a configuration in which changes in the directions and orientations of magnetic fields around a measuring point are detected as indices of the rotation angle of the change drum, the magnetic field generator may be configured to change the magnitudes of magnetic fields around a measuring point in accordance with the rotation angle of the change drum, and the magnetic field detector may detect the magnitude of a magnetic field at the measuring point, instead of detecting the direction. Thus, according to the present invention, the magnetic field generator may generally be configured to rotate along with the change drum so as to be capable of differentiating an ambient magnetic field. In the case where a change in the magnitude of a magnetic field is detected, it is necessary to highly accurately adjust the magnetic strength of the permanent magnet. In contrast, in cases such as the above-described embodiment, it is enough to increase the accuracy of the magnetic direction and orientation of the permanent magnet, and this is easier than adjusting the magnetic strength. Accordingly, a preferable configuration is such that the direction and orientation of a magnetic field is detected as an index of the rotation angle of the change drum.

While the structure disclosed herein is such that the magnetic field detector 140 is disposed outward of the change drum 60 in the axial direction, the present invention also includes a structure in which the magnetic field detector is disposed radially outward of the change drum. For example, the magnetic field generator may be disposed in a middle portion in the axial direction of the change drum. In this case, the magnetic field detector is preferably disposed radially outward of the change drum.

The shape of the magnetic field generator 110 does not necessarily have to be a ring shape.

The configurations described in the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

10 Motorcycle
40 Transmission
42 Case
43 Wall
43$h$ Through hole
44$s$ Screw hole
45 Bearing
50 Speed change gear mechanism
55 Shifting fork
56 Shift rod
60 Change drum
60$h$ Recess
61 Cam groove
62 Support shaft protrusion
64 Press-fit protrusion
66 Ball bearing
100 Rotation position detection device
110 Magnetic field generator
112 Permanent magnet
112$h$ Circular hole
114 Cover part
114$a$ Ring-shaped shock-absorbing part
114$h$1 Recess
114$h$2 Recess
118 Ring-shaped press-fit part
130 Magnetic field detection module
132 Holder
134 Fixing piece
140 Magnetic field detector
A Rotation axis
$\phi 1$ External diameter dimension of cam groove
$\phi 2$ Maximum external diameter dimension of change drum
$\phi 3$ External diameter dimension of magnetic field generator
$\phi 4$ External diameter dimension of support shaft protrusion
$\phi 5$ External diameter dimension of portion of change drum in which ball bearing is fitted

The invention claimed is:

1. A rotation position detection device for a change drum, comprising:
a magnetic field generator that is fixed to said change drum and that rotates along with said change drum to differentiate an ambient magnetic field, said change drum transmitting force necessary to shift a gear by rotating about a predetermined rotation axis;
a magnetic field detector that is formed separately from said magnetic field generator and fixed to a position at which said magnetic field changes in response to rotation of said magnetic field generator, to detect said magnetic field and output a signal that depends on a rotational position of said change drum on the basis of a detection result; and
a case that houses said change drum, wherein
said magnetic field detector is disposed at a position inward of a wall of said case and opposing said magnetic field generator along a direction of said rotation axis,
a through hole is formed in said wall,
said magnetic field detector is held by a holder,
said holder is inserted in said through hole to support said magnetic field detector,
a fixing piece protrudes from an outer periphery of said holder, and
said fixing piece is directly fixed to said wall with said holder inserted in said through hole such that said fixing piece protrudes in a direction away from said rotation axis, wherein
said through hole is for guiding a signal output by said magnetic field detector to outside of said case, and said through hole is formed at a position away from an extension of said rotation axis.

2. A rotation position detection device for a change drum according to claim 1, wherein
said magnetic field generator is fixed on a side toward said change drum with respect to a bearing by which one end of said change drum is rotatably supported, and
said magnetic field detector is supported radially outward of said bearing.

3. A motorcycle comprising the rotation position detection device for the change drum according to claim 1.

4. The rotation position detection device for the change drum according to claim 1, wherein
said fixing piece fixed to said case is provided to fix said magnetic field detector to said case via said holder, and
said wall separates said change drum and said fixing piece.

5. The rotation position detection device for the change drum according to claim 1, wherein said magnetic field generator has a rotationally asymmetric shape about said rotation axis.

6. The rotation position detection device for the change drum according to claim 1, wherein said magnetic field detector is disposed at a position inward in said axial direction of a shaft end of said change drum.

7. The rotation position detection device for the change drum according to claim 1, wherein
said magnetic field detector is held by said holder, in which said fixing piece protrudes from said outer periphery of said holder, said through hole having a circular shape and said holder having a circular columnar shape.

8. The rotation position detection device for the change drum according to claim 1, further comprising:
a first bearing at a side of said magnetic field detector that is formed in a shape of a recess capable of receiving a support shaft protrusion of said change drum, and
a second bearing opposite to said magnetic field detector that is formed of a ball bearing.

9. The rotation position detection device for the change drum according to claim 8, wherein said holder is supported by said wall at a position adjacent to said bearing recess.

10. The rotation position detection device for the change drum according to claim 1, wherein said magnetic field detector is supported by a wall at a side of a secondary speed-reducing mechanism of said case, in which a sprocket is provided.

11. The rotation position detection device for the change drum according to claim 10, wherein said magnetic field detector is supported by said wall at a position away from said rotation axis of said change drum in a radial direction.

12. A rotation position detection device for a change drum, comprising:
a magnetic field generator that is fixed to said change drum and that rotates along with said change drum to differentiate an ambient magnetic field, said change drum transmitting force necessary to shift a gear by rotating about a predetermined rotation axis;
a magnetic field detector that is formed separately from said magnetic field generator and fixed to a position at which said magnetic field changes in response to rotation of said magnetic field generator, to detect said magnetic field and output a signal that depends on a rotational position of said change drum on the basis of a detection result; and
a case that houses said change drum, wherein
said magnetic field detector is disposed at a position inward of a wall of said case and opposing said magnetic field generator along a direction of said rotation axis,
a through hole is formed in said wall,
said magnetic field detector is held by a holder,
said holder is inserted in said through hole to support said magnetic field detector,
a fixing piece protrudes from an outer periphery of said holder, and
said fixing piece is directly fixed to said wall with said holder inserted in said through hole such that said fixing piece protrudes in a direction away from said rotation axis, wherein
said change drum is formed in a stepped shape having different radial dimensions in a direction of extension of said rotation axis,
said magnetic field generator is formed in a ring shape centered about said rotation axis, and
said magnetic field generator has an external diameter dimension that is smaller than a maximum external diameter dimension of said change drum and greater than a minimum external diameter dimension of said change drum.

13. A rotation position detection device for a change drum, comprising:
a magnetic field generator that is fixed to said change drum and that rotates along with said change drum to differentiate an ambient magnetic field, said change drum transmitting force necessary to shift a gear by rotating about a predetermined rotation axis;
a magnetic field detector that is formed separately from said magnetic field generator and fixed to a position at which said magnetic field changes in response to rotation of said magnetic field generator, to detect said magnetic field and output a signal that depends on a rotational position of said change drum on the basis of a detection result; and
a case that houses said change drum, wherein
said magnetic field detector is disposed at a position inward of a wall of said case and opposing said magnetic field generator along a direction of said rotation axis,
a through hole is formed in said wall,
said magnetic field detector is held by a holder,
said holder is inserted in said through hole to support said magnetic field detector,
a fixing piece protrudes from an outer periphery of said holder, and
said fixing piece is directly fixed to said wall with said holder inserted in said through hole such that said fixing piece protrudes in a direction away from said rotation axis, wherein
said change drum has a press-fit part that protrudes along said rotation axis, and
said magnetic field generator includes a ring-shaped permanent magnet having a through hole for fixation, and a shock-absorbing part that fixes said permanent magnet to said press-fit part while intervening between said press-fit part and said permanent magnet.

* * * * *